(12) United States Patent
Barel

(10) Patent No.: US 10,838,517 B2
(45) Date of Patent: Nov. 17, 2020

(54) STYLUS AND DOCKING STATION WITH JOYSTICK FUNCTION

(71) Applicant: Microsoft Technology Licensing, LLC, Redmond, WA (US)

(72) Inventor: Eliyahu Barel, Beit-Aryeh (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 671 days.

(21) Appl. No.: 14/987,866

(22) Filed: Jan. 5, 2016

(65) Prior Publication Data
US 2017/0192538 A1    Jul. 6, 2017

(51) Int. Cl.
| G09G 5/00 | (2006.01) |
| G09G 5/08 | (2006.01) |
| G06F 3/0354 | (2013.01) |
| G06F 1/16 | (2006.01) |
| G06F 3/0338 | (2013.01) |
| G06F 3/044 | (2006.01) |
| G06F 3/039 | (2013.01) |
| G06F 3/041 | (2006.01) |
| G06F 3/038 | (2013.01) |
| G06F 3/0362 | (2013.01) |

(52) U.S. Cl.
CPC ........ *G06F 3/03545* (2013.01); *G06F 1/1632* (2013.01); *G06F 3/038* (2013.01); *G06F 3/039* (2013.01); *G06F 3/0338* (2013.01); *G06F 3/0362* (2013.01); *G06F 3/044* (2013.01); *G06F 3/0416* (2013.01); *G06F 2200/1632* (2013.01)

(58) Field of Classification Search
None
See application file for complete search history.

(56) References Cited

U.S. PATENT DOCUMENTS

| 2003/0076302 A1* | 4/2003 | Langstraat | G06F 1/1626 345/161 |
| 2004/0135765 A1* | 7/2004 | Kinerk | G06F 3/0487 345/156 |
| 2004/0212586 A1* | 10/2004 | Denny, III | G06F 1/169 345/156 |
| 2012/0182261 A1* | 7/2012 | Wang | G06F 3/044 345/174 |
| 2012/0296511 A1* | 11/2012 | More | G05D 1/0242 701/26 |
| 2015/0378455 A1* | 12/2015 | Immel | H02J 7/0042 345/179 |

\* cited by examiner

*Primary Examiner* — Carl Adams

(57) ABSTRACT

A stylus placed in a docking station is used as a joystick by setting up a self-capacitance or mutual capacitance between the stylus and the docking port and measuring changes in that mutual capacitance as the stylus is moved by the user. The mutual capacitance is set up using electrodes and/or the housing of the stylus and the changes may be measured either from the stylus or from the docking station.

20 Claims, 13 Drawing Sheets

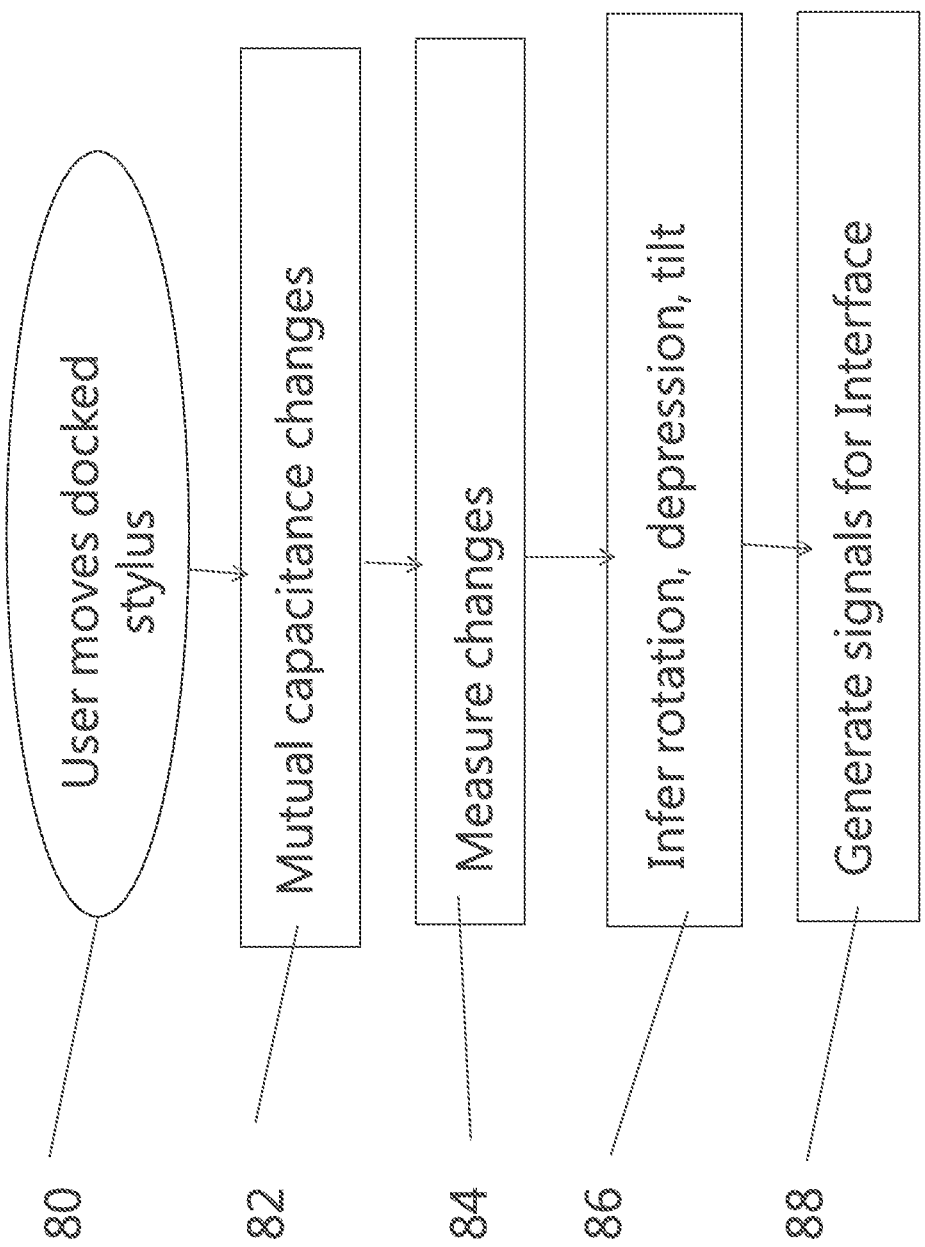

STYLUS AND DOCKING STATION WITH JOYSTICK FUNCTION

BACKGROUND

Styluses are known in the art for use with digitizer systems such as with digitizer systems that are integrated with a display screen, e.g. a touch screen. Stylus position is sensed by the digitizer system and used to provide input to a computing device associated with the display screen. Position of the stylus is typically correlated with virtual information displayed on the display screen. Inputs originating from the stylus are typically interpreted as user commands or user inputs for commands Some portable computing devices include a compartment for storing the stylus while not in use.

SUMMARY

The present embodiments provide a stylus which, when placed in a suitable docking station, acts as a joystick. A mutual capacitance is set up between the stylus and electrodes on the docking station, which changes in the event of small movements of the stylus, which are thereby detected and may be used as input to a digital interface. The embodiments further provide a docking station with a flexible layer in a docking recess that allows an inserted stylus to be tilted or depressed. The flexible or compressible layer changes the distance between electrodes in the docking station and electrodes on the stylus, allowing detection of tilt. As the stylus tilts, the electrodes get closer at one side, there is more coupling between the electrodes and the signal is higher, and conversely, on the opposite side, away from the tilt the signal becomes lower. Downward pressure on the stylus changes lengths of oppositely facing electrodes that coincide, also causing changes to the coupling capacitance. The embodiments further provide for a stylus and docking station with correspondingly placed electrodes that allow for a mutual capacitance which is measurably altered when the stylus is rotated while docked in the docking station.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 12 is a simplified flow chart showing joystick operation of various embodiments.

DETAILED DESCRIPTION

Figure 1A:
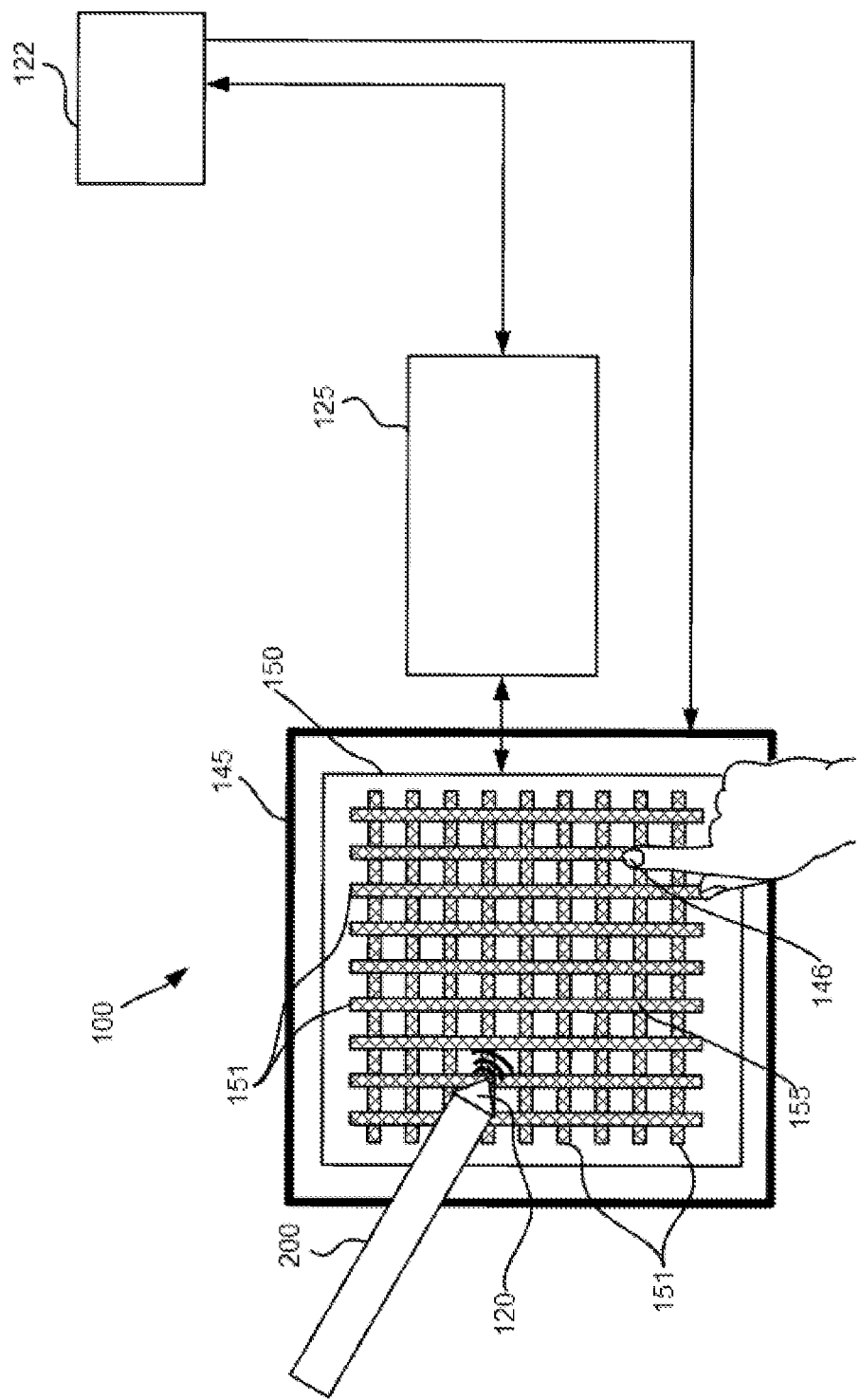
FIG. 1A is a simplified diagram showing a stylus in conventional use with a touch screen.

The present examples may provide a stylus for digital interaction which, when inserted into a docking station may act as a joystick.

A stylus placed in a docking station is used as a joystick by creating a mutual capacitance or a/self-capacitance interaction between the stylus and the docking port and measuring changes in the capacitance as the stylus is moved by the user. The capacitive interaction, whether self-capacitance or mutual capacitance, is created using electrodes and/or the housing of the stylus. Changes in capacitance may be measured either by the stylus or the docking station.

The docking station may be provided with a flexible layer, e.g., rubber, that lines the insertion hole, allowing the joystick to be depressed, and tilted to different angles. In addition the stylus may be rotated while in the insertion hole. The movements of the stylus are detected using variations in capacitive coupling between electrodes on the stylus and on the docking station. The changes in coupling may be measured either on the docking station or on the stylus itself.

More particularly, a stylus has a housing. Either an electrode is positioned on the stylus housing, or the housing as a whole acts as the electrode. A docking station for the stylus has a docking port to receive the stylus. A second electrode extends within the docking port, and the two electrodes are designed to become capacitively coupled while the stylus is docked in the docking station. A circuit is connected to one of the electrodes and detects changes in capacitive coupling between the two electrodes based on depression, rotation or tilt of the stylus in the docking station. The changes are measured and used as input to a digital interface, thus allowing the stylus to be used as a joystick.

In one embodiment the stylus is the active component, and in a second embodiment, the docking station is the active component. In a third embodiment, both are active. The difference between the three embodiments may be summarized as follows:

1) Wherein the stylus is active and the docking is passive: in this example, there is an active electrode or electrodes on the stylus and a passive electrode on the docking station, and the capacitance measurement (of mutual capacitance or self-capacitance), and the stylus performs communication with the system of the measured data and other parameters. The stylus measures change in capacitance between the stylus and the docking station.

2) Wherein the stylus is passive and the docking is active: in this example, there is no electrode on the stylus, but rather a metallic stylus body is used as a passive electrode and provides a path to ground through the user. The docking station has active electrodes. The docking station measures capacitance changes and performs communication with the system of the measured data and other parameters.

3) Wherein both the stylus and the docking station are active: in this example, both the stylus and the docking station have active electrodes and require power to energize the electrodes. Either one of them may communicate with the system to report capacitance measurements.

In an embodiment, the stylus electrode may be the stylus housing itself as mentioned, or may be made up of multiple longitudinally extending electrode strips or electrode buttons, or may be made up of rectangles or triangles, including two circumferentially extending triangles together forming a cylinder. The docking station may have any of the same and electrodes of the docking station may be arranged to be located opposite complementary or corresponding electrodes of the stylus, as will be discussed in greater detail below.

The docking station may include a charging connector for the stylus, and in an embodiment, the charging connector may also carry signals relating to the capacitance measurement.

This disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring now to the drawings, FIG. 1A is a schematic diagram illustrating a stylus used with a touch screen.

A computing device 100 includes a display screen 145 that is integrated with a digitizer sensor 150. In some exemplary embodiments, digitizer sensor 150 is a grid based capacitive sensor formed with conductive strips 151 that are operative to detect input by stylus 200 transmitting an electromagnetic signal and/or touch of one or more fingertips 146 or other conductive objects. In some exemplary embodiments, the input provided by stylus 200 is one or more signal bursts and/or pulses that are transmitted by the stylus at a defined repetition rate. In some exemplary embodiments, digitizer circuitry 125 manages a synchronization signal for synchronizing signal bursts emitted by stylus 200 with sampling windows for sampling output from sensor 50. Optionally, one or more signal bursts and/or pulses that are transmitted by stylus 200 include information regarding operation of stylus 200 and/or pressure applied on a tip 120 of stylus 200. Typically, the signal bursts transmitted by stylus 200 are picked up by one or more conductive trips 151 on both the horizontal and vertical axis of the grid and the information is decoded by digitizer circuitry 125. Typically, location of the stylus tip 20 as well as additional information as provided by stylus 200 is reported to host 122 associated with the digitizer sensor 150.

Optionally, a mutual capacitance detection method and/or a self-capacitance detection method are applied on sensor 150 for sensing interaction with fingertip 146. Typically, during mutual capacitance and self-capacitance detection, digitizer circuitry 125 is required to send a triggering pulse and/or interrogation signal to one or more conductive strips 151 of digitizer sensor 150 and to sample output from conductive strips 151 in response to the triggering and/or interrogation. In some embodiments, some or all of conductive strips 151 along one axis of the grid based sensor are interrogated simultaneously or in a consecutive manner, and in response to each interrogation, outputs from conductive strips 151 on the other axis are sampled. This scanning procedure provides for obtaining output associated with each junction 155 of the grid based sensor 150. Typically, this procedure provides for detecting one or more conductive objects, e.g. fingertip 146 touching and/or hovering over sensor 50 at the same time (multi-touch). Optionally, digitizer circuitry 125 alternates between scanning digitizer sensor 150 for detection of one more fingertips 146 and sampling outputs on both the horizontal and vertical conductive strips 151 for location a signal transmitted by stylus 200.

Typically, output from digitizer circuitry 125 is reported to host 122. Typically, the output provided by digitizer circuitry 125 includes coordinates of a stylus 200, e.g. coordinates of writing tip 120 and/or coordinates of one or more fingertips 146 interacting with digitizer sensor 150. Optionally, digitizer circuitry 125 additionally reports a hover or touch state for stylus 200 and/or fingertip(s) 146. Optionally, digitizer circuitry 125 additionally identifies coordinates as originating from stylus 200 or fingertip 146. Optionally, digitizer circuitry 125 additionally reports pressure applied on a tip of stylus 200. Typically, digitizer circuitry 125 uses both analog and digital processing to process signals and/or data picked up from sensor 150. Optionally, some and/or all of the functionalities of digitizer circuitry 125 are integrated and/or included in host 122.

Figure 1B:
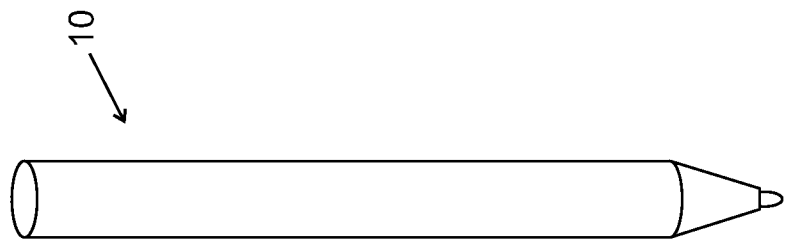
FIG. 1B is a simplified diagram showing a stylus with a docking station.
Figure 1B:
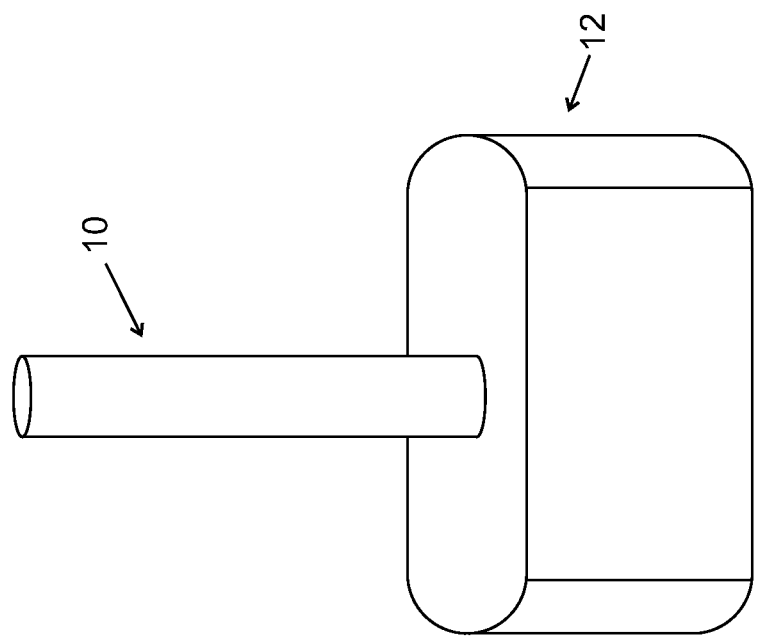
Figure 1B:
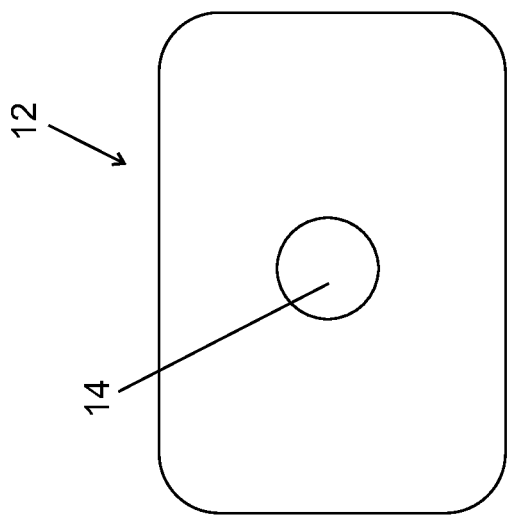

FIG. 1B illustrates a kit comprising stylus 10, and a docking station 12. The docking station is shown from above and from a perspective point of view with the stylus inserted. Stylus 10 is moved by a user and position is sensed by a digitizer system and used to provide input to a computing device which input is used to move a cursor or otherwise allow the user to interact with a display screen. Position of the stylus is typically correlated with virtual information displayed on the display screen. Inputs originating from the stylus are typically interpreted as user commands or user inputs for commands Docking station 12 includes a docking port 14 for storing the stylus while not in use and the recess may include a contact for recharging the stylus.

Figure 2:
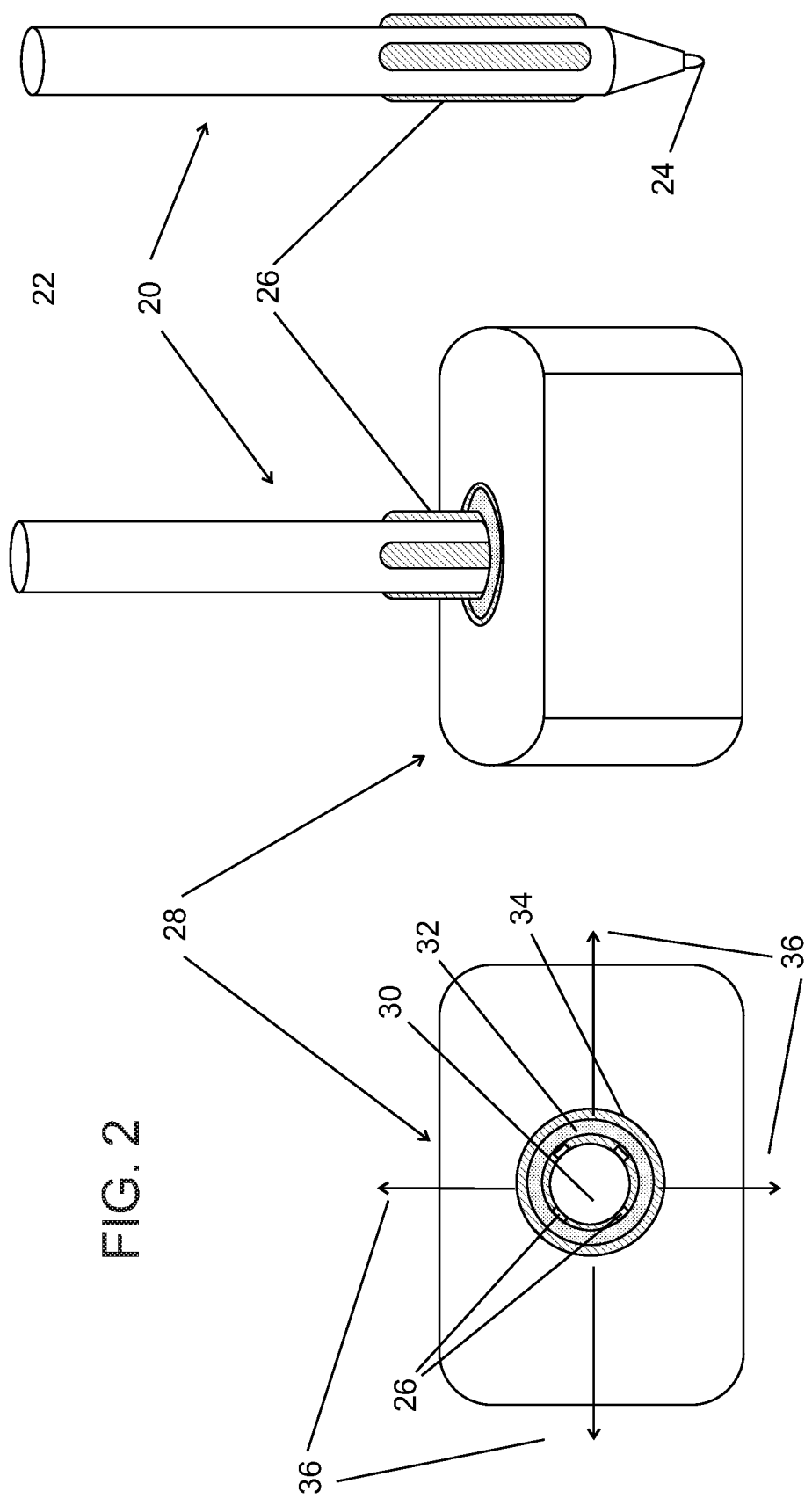
FIG. 2 is a simplified diagram showing an embodiment in which multiple longitudinal electrodes are provided on the stylus in order to obtain mutual capacitance with corresponding electrodes on the docking station.

Reference is now made to FIG. 2, which shows a first kit showing the stylus alone, and the stylus inserted in the docking station in a side perspective view and as a transverse cross section. As shown, the kit comprises a stylus 20 having a top end 22 and a tip end 24, and having longitudinally aligned electrodes 26 around an outer housing of the stylus towards the tip end 24. The electrodes may bulge outwardly from the circumference of the stylus. Various shapes of bulge or form factors may be used to increase the capacitive coupling or maximize the differential in the capacitive coupling. As an alternative, the electrodes may be constructed not to bulge, to make it more comfortable to hold when using it as a pen. The electrodes may in one embodiment be embedded within the pen and covered by a dielectric.

Docking station 28 includes a docking port for insertion of the stylus 20. The docking port is a cylindrical recess in the docking station which is size-matched for the stylus and may be tapered inwardly to match the tapering at the tip of the stylus to hold the stylus firmly when docked. The docking port includes flexible resilient layer 32, which may be elastic, and a ring electrode 34. The stylus 20 is inserted into the docking station. Resilient layer 32 allows the stylus to be tilted or depressed and to return to a normal position when pressure is released, and the change in mutual coupling between electrodes 26 and 32 during motion allows for the tilt or depression to be measured. Tilt may be measured in terms of positive and negative x and y directions, as indicated by the directions of arrows 36. In the embodiment shown, the tilt is measured by a circuit within stylus 20 which measures the capacitance on the stylus electrodes 36. As shown there are four stylus electrodes, and the stylus electrodes change their mutual capacitances or self-capacitance during tilt of the stylus as some are moved closer to the ring electrode 34 and others are moved further away. It is noted that four is only exemplary. There could be three or less or there could be five or more.

In addition to tilt, the embodiment of FIG. 2 also measures depression, as the mutual coupling increases as the stylus 20 is depressed downwards into the docking station.

In the embodiment of FIG. 2, the measurement circuit is in the stylus and the stylus already includes an on-board A-D converter for digitizing. Thus digitized signals may be produced from the joystick mode on the stylus itself.

In the embodiment of FIG. 2, ring electrode 34 is symmetrical, and thus rotation is not measured.

Figure 3:
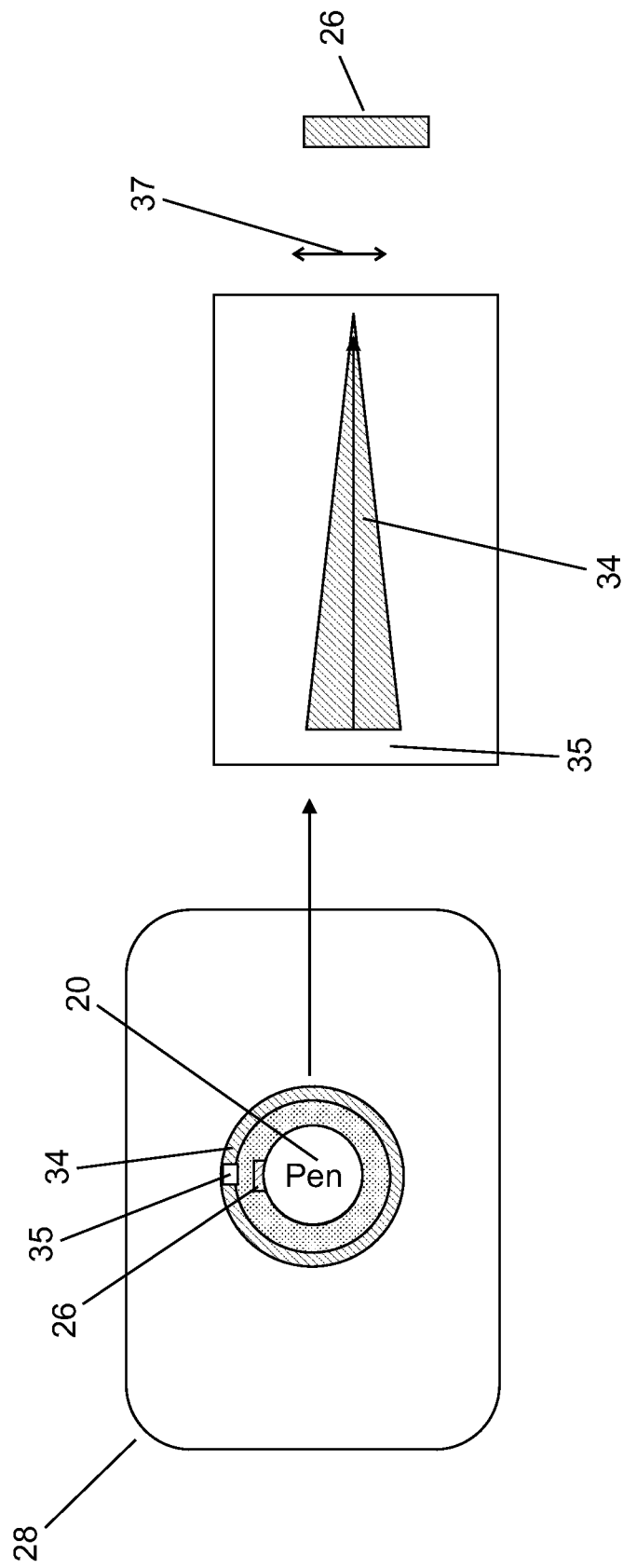
FIG. 3 is a simplified diagram showing an electrode layout for detecting of rotation in the embodiment of FIG. 2 in the case of one or more electrodes on the pen and docking for mutual capacitance or self-capacitance modes.

Reference is now made to FIG. 3, which is a simplified diagram illustrating an alternative shape for the ring electrode 34 to allow rotation to be measured, and showing the corresponding configuration of stylus-mounted electrode 26. A plan view of the docking station 28 is shown on the left hand side and the right hand side shows the circumferential direction of the docking port schematically unrolled. Stylus mounted electrode 26 is shown further to the right as a rectangle. In FIG. 3, electrode 34 extends as before as a ring around the docking port in the docking station 28. However, the width 37 of the ring electrode varies with angle around the circumference of the ring, as shown on the right hand side, to provide a triangular shaped structure. The width affects the mutual coupling with electrode 26, whose height corresponds to the maximum width of the electrode 34, so that the rotation angle of the stylus can be measured. In some applications it may be desirable to measure absolute angle, and measurement of the mutual coupling may provide such an absolute value, but in most cases only relative angle is needed, that is, it is only necessary to determine that the stylus is rotating, in which direction it is rotation, and the speed at which it is rotating.

Reference is now made to FIG. 4, which again shows an alternative structure for the ring electrode 34 on the inside of the docking port of docking station 28, and for the electrode 26 on the stylus. The embodiment of FIG. 4 may allow for both rotation and depression of the stylus to be measured. Ring electrode 34 includes triangular part 39.1 and cylindrical part 39.2. The triangular part 39.1 works as in FIG. 3 to provide a coupling that varies with rotation angle, and works with rectangular electrode part 38 on the stylus. Cylindrical part 39.2 provides mutual coupling with downwardly pointing triangular electrode element 43 on stylus 20, to provide a variation depending on the extent of depression of the stylus 20 into the docking station 28. As the stylus is depressed, element 43 moves downwardly in the direction of arrow 45 and increasingly overlaps the element 39, increasing the mutual coupling so that the extent of depression may be measured. The depression is against the elastic layer 32, which ensures that the stylus returns to the non-depressed position when the user releases pressure, so that depression of the stylus 20 within the docking station 28 gives the user the feel of pressing a button.

Figure 4:
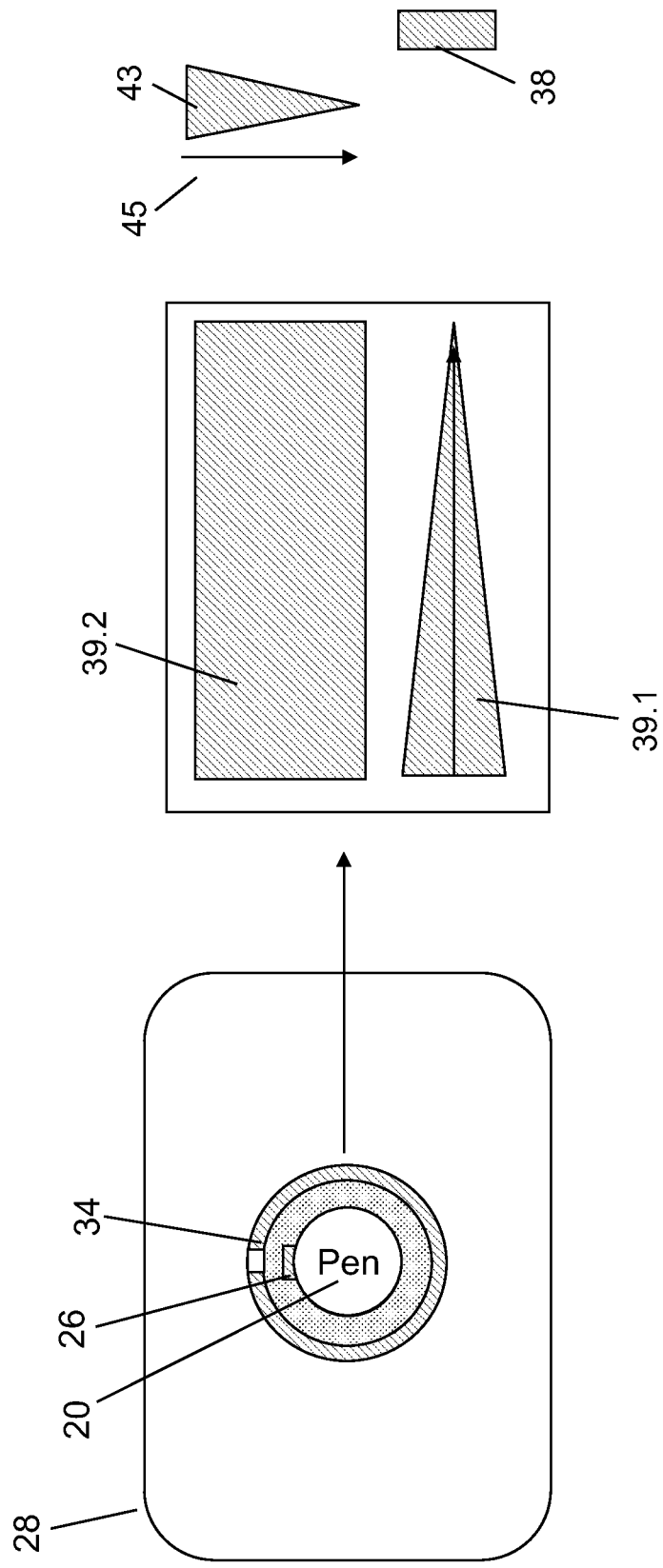
FIG. 4 is a simplified diagram showing an electrode layout for detecting of rotation and motion in the z axis of the embodiment of FIG. 2.
Figure 5:
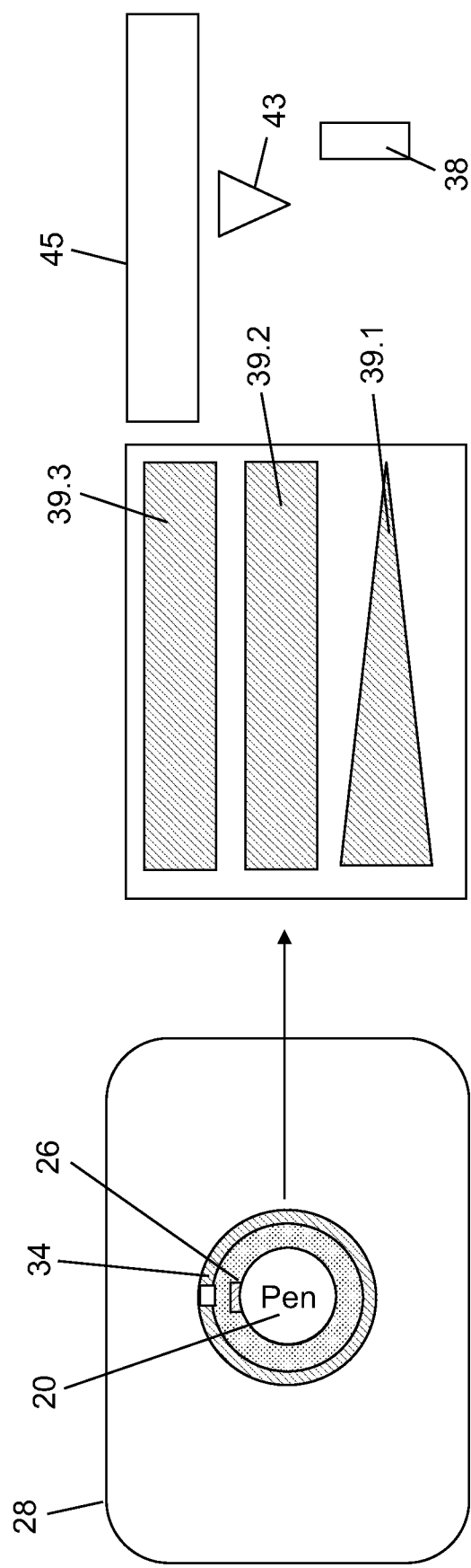
FIG. 5 is a simplified diagram showing an electrode layout for detecting of rotation and motion in the x, y and z axes of the embodiment of FIG. 2.

Reference is now made to FIG. 5, which is a simplified diagram showing the same structure as in FIG. 4 for the two electrodes, but with additional elements on the stylus 20 and docking station 28. The embodiment of FIG. 5 may measure tilt, rotation and depression. Ring electrode 34 comprises triangular section 39.1, first cylindrical section 39.2 and second cylindrical section 39.3. The triangular section 39.1 works as above to provide a differential coupling with stylus element 38 with respect to rotation. The first cylindrical section 39.2 also works as before, with triangular stylus element 43, to provide a differential coupling with respect to depression. The second cylindrical section 39.3 is opposite a similar cylindrical section 45 on the wall of the stylus 20, and changes in the angle of the stylus causes variation in the separation between the two cylindrical electrode sections 39.3 and 45, leading to variation in the mutual capacitance that allows for the tilt to be measured.

Figure 6:
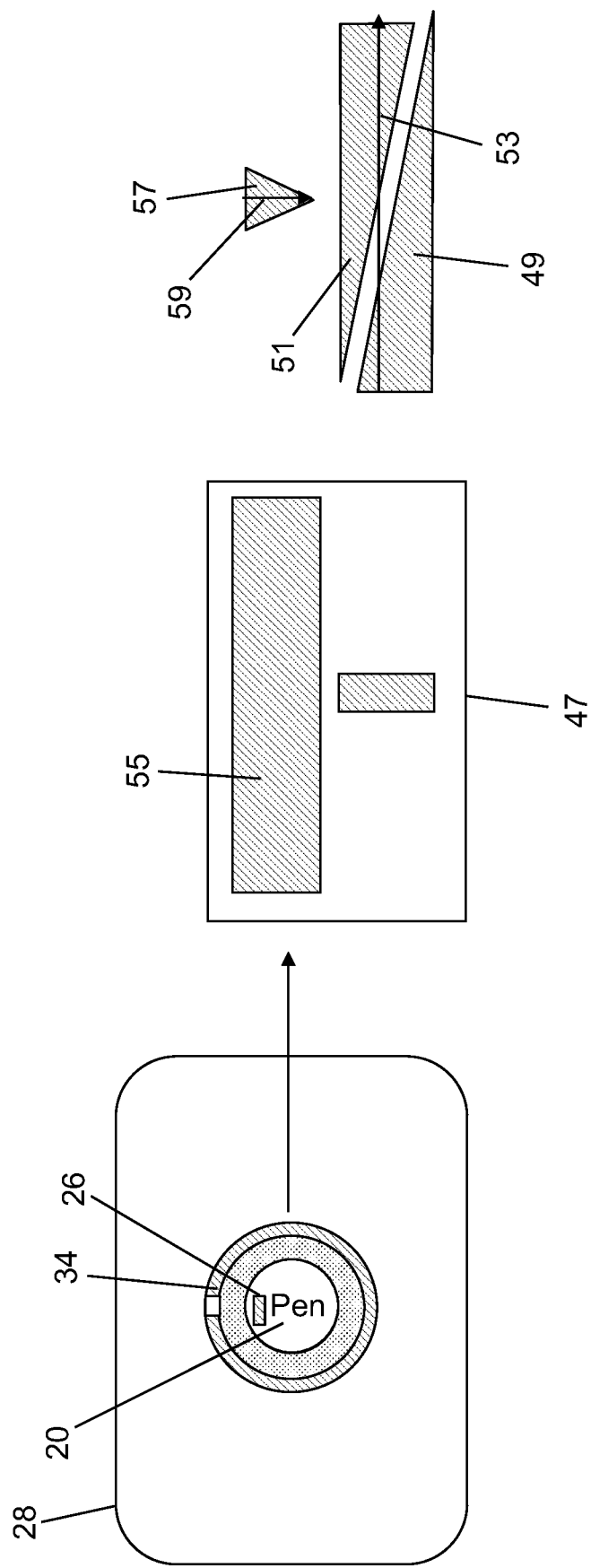
FIG. 6 is a simplified diagram showing an alternative electrode layout for detecting of rotation and motion in the x, y and z axes of the embodiment of FIG. 2.

Reference is now made to FIG. 6, which is a simplified diagram showing a further electrode arrangement for detecting tilt, depression and rotation. A plan view of the docking station 28 is shown on the left hand side and the right hand side shows the circumferential direction of the docking port schematically unrolled. Stylus mounted electrode elements are shown further to the right.

Electrode 47 on the docking station is a relatively narrow rectangle. The stylus has two triangular elements 49 and 51 which between them complete a cylindrical section or ring. As the stylus rotates, the rectangle 47 passes along the triangles in the direction of arrow 53, and the coupling in each triangle changes. The coupling from the two triangles added together may also give the tilt as the two triangles complete a cylinder.

Cylinder section or ring 55 extends around the docking station, and lies opposite downward pointing triangle 57 on the stylus. As the stylus is depressed, triangle 57 moves downwards in the direction of arrow 59 and the mutual coupling between triangle 57 and cylinder section 55 increases.

Figure 7:
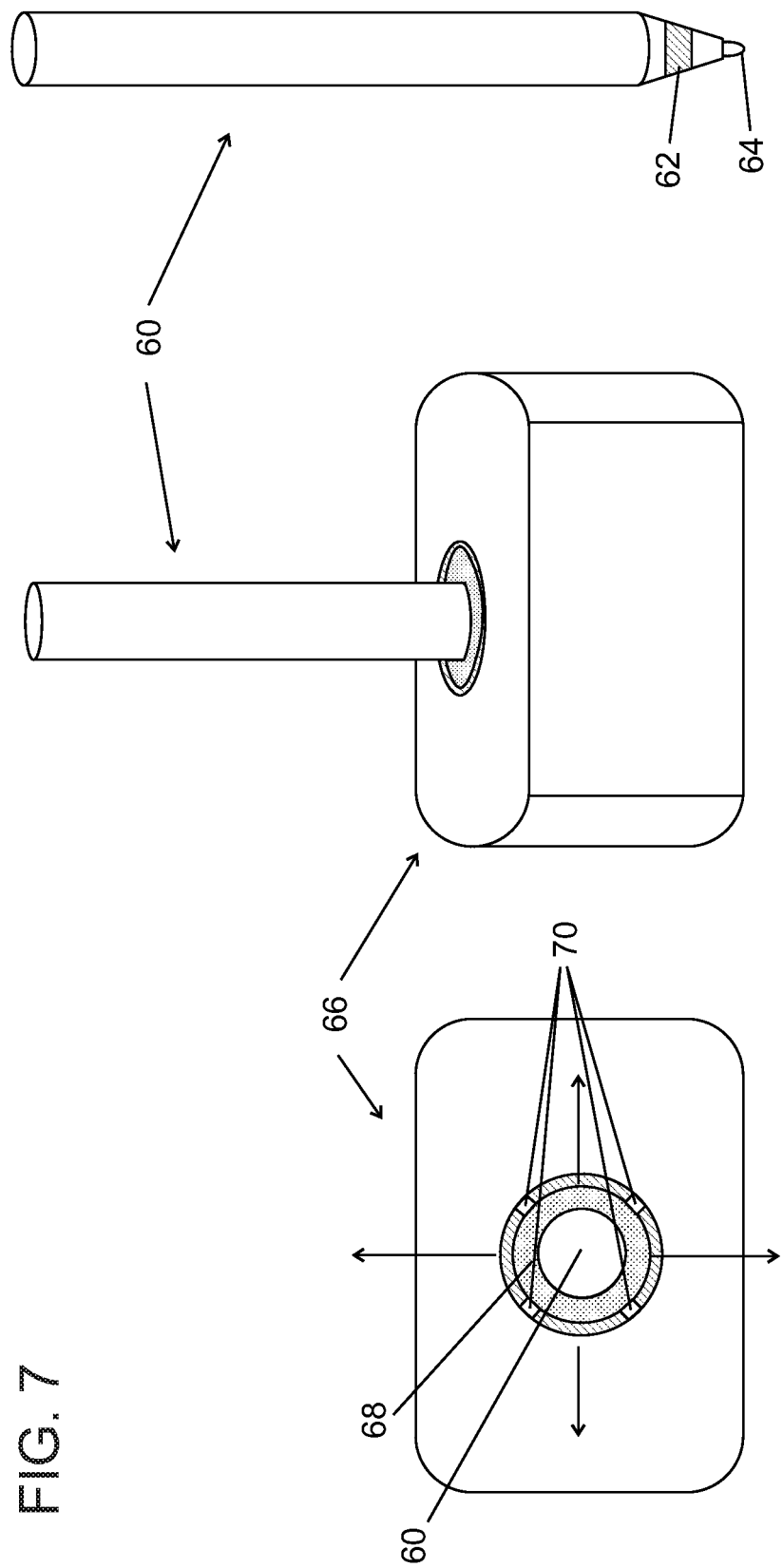
FIG. 7 is a simplified diagram showing an embodiment in which a ring electrode is provided on the stylus and longitudinal electrodes are provided on the docking station.

Reference is now made to FIG. 7, which is a simplified embodiment which illustrates a variation on the theme of FIG. 2 in which the change in mutual capacitance is measured on the docking station. Stylus 60 has an electrode 62 at the end towards tip 64. Electrode 62 extends circumferentially around the stylus just above the tip 64. Docking station 66 comprises flexible layer 68 as before and four vertical electrodes 70. The four vertical electrodes 70 experience the changed mutual capacitance as the stylus is moved vertically, rotated or tilted and the changing capacitance causes a signal to arise and be transmitted to a measurement circuit on board the docking station.

Figure 8:
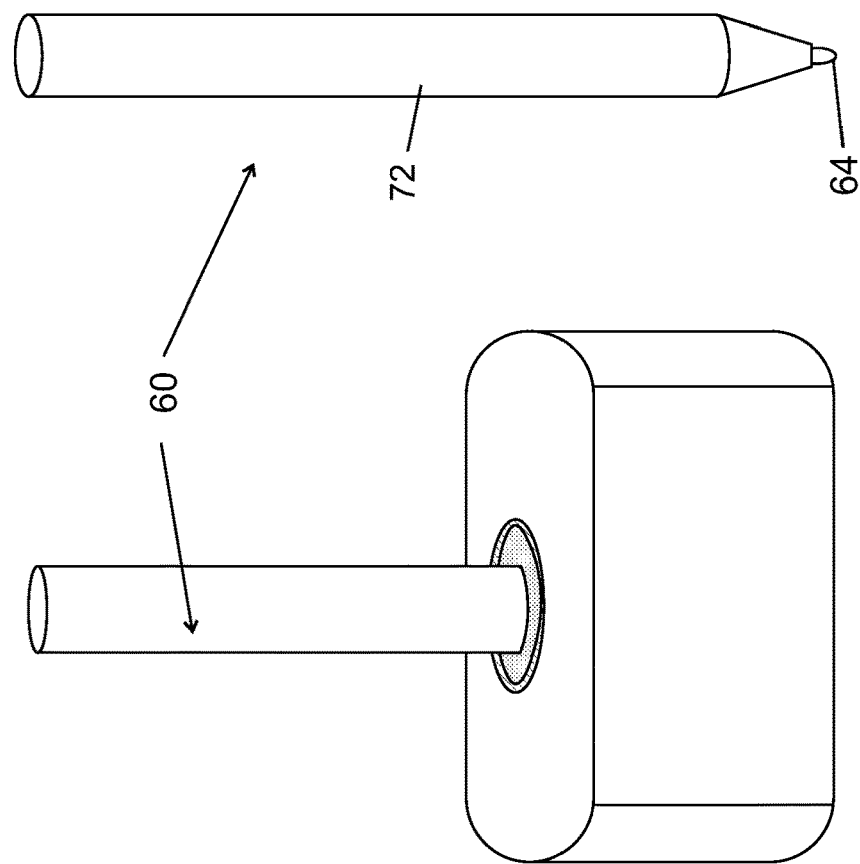
FIG. 8 is an active stylus where the stylus housing acts as an electrode, according to the present embodiments.
Figure 8:
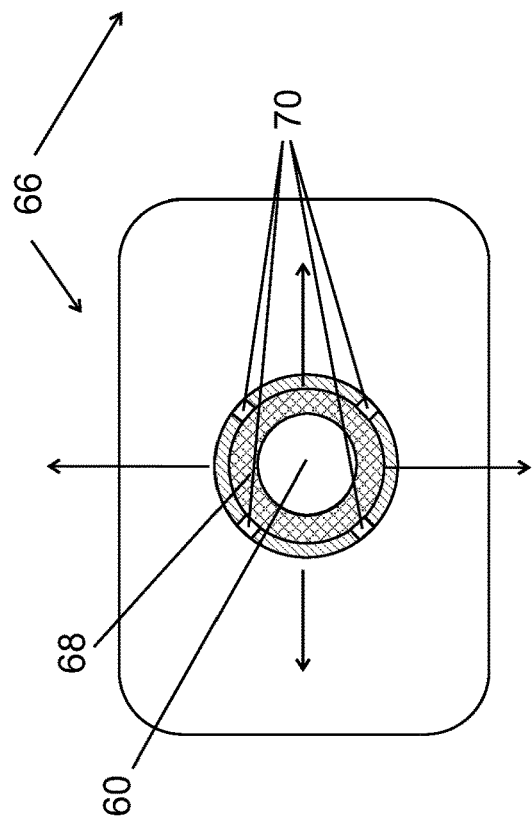

Reference is now made to FIG. 8, which illustrates a variation of the embodiment of FIG. 7. The mutual capacitance is again measured on the docking station. Stylus 60 has outer housing 72, which is grounded and acts as a single all-enveloping electrode. Docking station 66 comprises flexible layer 68 as before and four vertical electrodes 70. The four vertical electrodes 70 experience the changed mutual capacitance as the stylus is depressed, or tilted and the signal is transmitted to a measurement circuit on board the docking station. Specifically, as the stylus is depressed the capacitance at all of the electrodes is increased. As the stylus is tilted some of the electrodes become closer to the stylus and some further away, causing different capacitances to be measured in the different electrodes.

Figure 9:
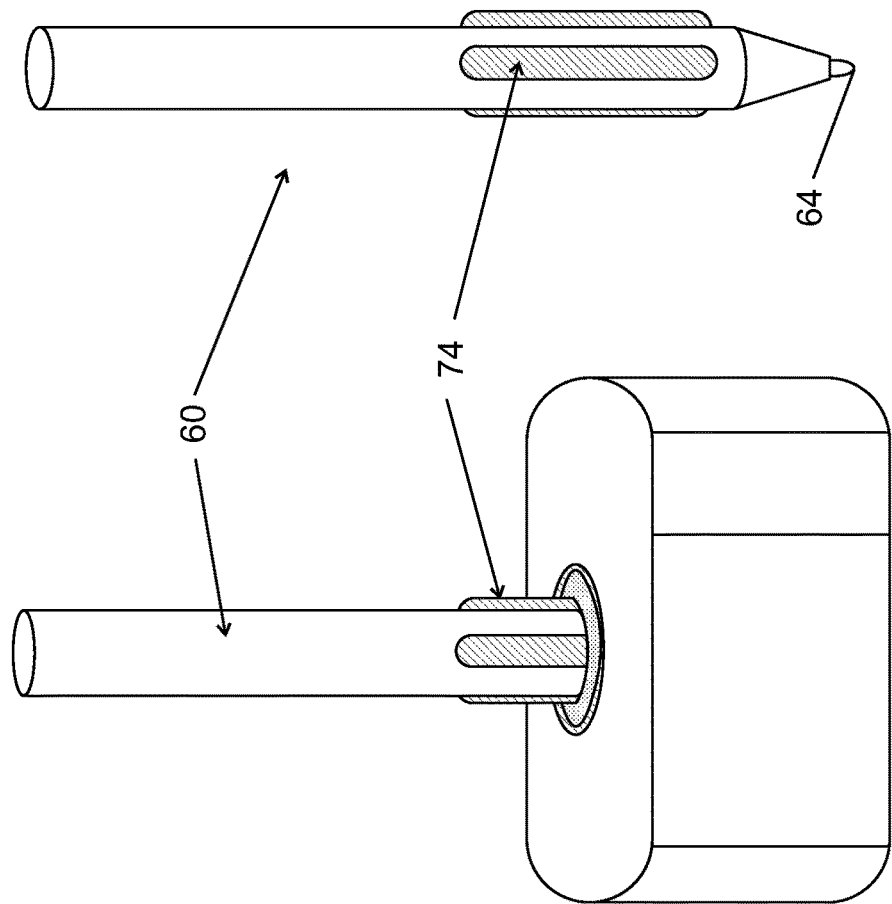
FIG. 9 is an active stylus with electrodes on the pen, according to the present embodiments.
Figure 9:
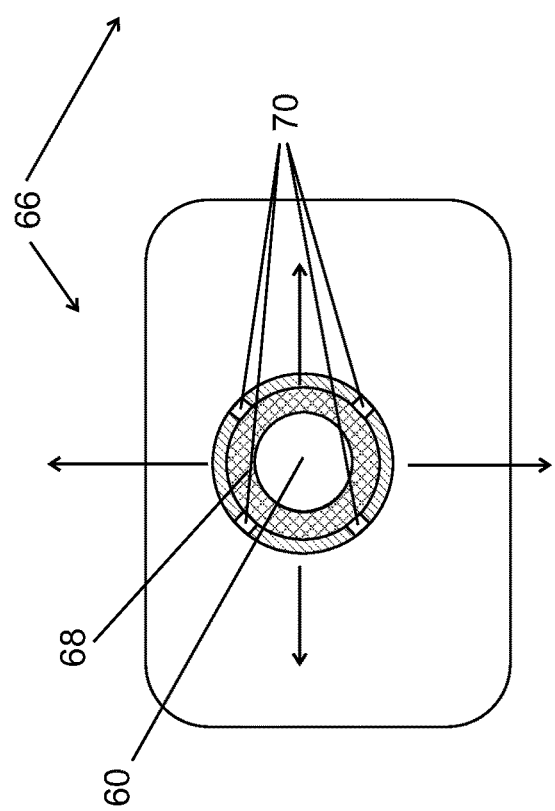

Reference is now made to FIG. 9 which is a further variation of the embodiment of FIG. 7. Yet again, the mutual capacitance is measured on the docking station 66. Stylus 60 has lengthwise extending transmit electrodes 74. There are typically three or four transmit electrodes although other numbers may be contemplated. Docking station 66 comprises flexible layer 68 as before and four vertical electrodes 70. The four vertical electrodes 70 of the docking station experience changed mutual capacitance as the stylus is depressed, rotated or tilted, and the signal is transmitted to a measurement circuit on board the docking station. Specifically, as the stylus is depressed the capacitance at all of the electrodes is increased. As the stylus is tilted some of the electrodes become closer to the stylus and some further away, causing different capacitances to be measured in the different electrodes. Likewise with rotation, the different electrodes are at different distances at different parts of the rotation.

In the case where measurement is carried out on the stylus, that is in the embodiment of FIG. 2, a second transmitter may be used, in addition to the stylus's standard transmitter located on the tip. More generally, the joystick signal may be provided through any kind of communication available, and may use spare capacity remaining in bandwidth of the typical tip communication of the stylus indicating its position.

Communication may be from the stylus to a computing device that has a receiver for close range wireless, for example via Bluetooth.

In one embodiment, the stylus may also transmit joystick data to the docking station, either wirelessly or via a contact. The docking station may then transmit the data to the computer either wirelessly or via a tether.

The docking station may or may not be tethered to the computing device that the stylus is interacting with. If tethered then signals may be provided via the tether. If not tethered then signals may be provided wirelessly.

Figure 10:
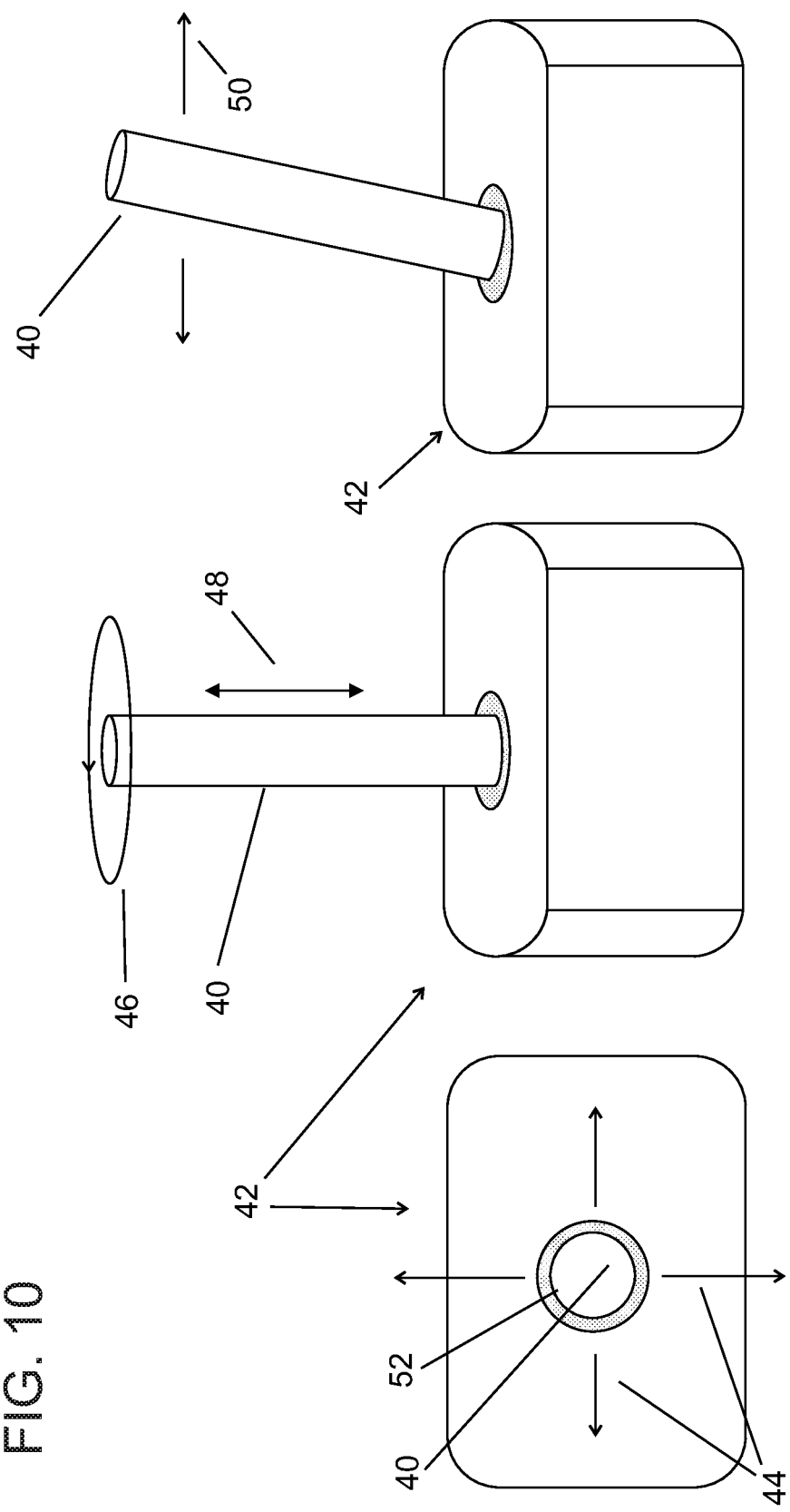
FIG. 10 is a simplified diagram showing a stylus in a docking station and illustrating joystick motions that may be detected according to the present embodiments.

Reference is now made to FIG. 10, which shows two side perspective views and one plan view of the stylus 40 inside the docking station 42 and illustrates the motion of the stylus as a joystick. The stylus is inserted into a mating position in the docking station as discussed where it is held firmly due to the size of the depression in a normal position, that is the position that the stylus takes due to the shape of the docking port without external pressure being applied. The depression is lined with an elastic material so that the stylus can be depressed or tilted to deform the elastic layer but returns to the normal position when the pressure is released. The small changes in position of the stylus due to deformation of the elastic layer are measured by the electrode arrangements of the present embodiments as discussed, and FIG. 10 illustrates the various deformations. The plan view shows different tilt directions 44 that may be applied to the stylus. The middle view shows the stylus 40 vertical within the docking station and being rotated according to arrow 46 or downwardly depressed according to arrow 48. The right hand view shows the stylus 40 being tilted in the direction of arrow 50.

In each of the cases of vertical movement, tilt and rotation, a change in mutual or self capacitance can be measured from the electrodes and provided to a digitizer to be used as interaction signals to allow the user to interact with a screen. The tilt and depression motions squeeze the flexible layer 52, as discussed.

Figure 11:
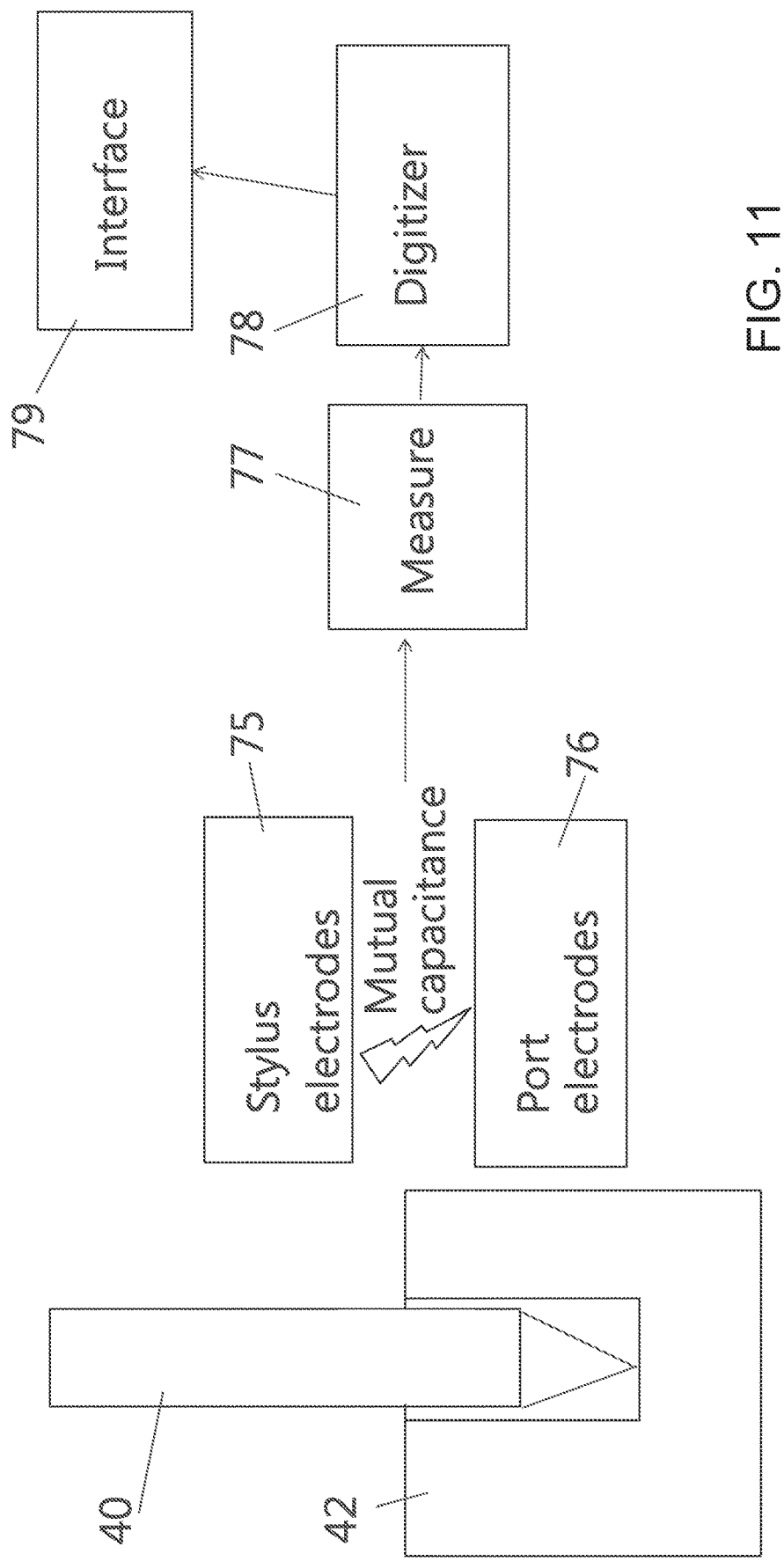
FIG. 11 is a simplified block diagram showing circuitry for measuring movement of the stylus as a joystick according to the present embodiments.

Reference is now made to FIG. 11, which is a simplified block diagram showing circuitry for measuring the movement of a stylus when used as a joystick, according to embodiments of the present invention. As shown in FIG. 11, when the stylus 40 is located in docking station 42 a coupling capacitance is created between the stylus electrode arrangement 75 and the docking station electrodes or port electrodes 76. The coupling capacitance varies with motion as discussed and measuring unit 77 measures the changes. In general one set of electrodes is grounded and the measurement is taken from the non-grounded electrodes so that the measurement unit 77 may be either in the stylus or in the docking station. Digitizer 78 then digitizes the measurement signals for sending to a computing interface 79 such as that on a personal computer, tablet, smartphone, wearable device, Internet-of-Things device, or any other computing device.

Reference is now made to FIG. 12, which is a simplified flow chart illustrating operation of the stylus as a joystick according to various of the present embodiments. The user may move the docked stylus in any of the ways in which a joystick is moved—80, so that mutual capacitance, or capacitive coupling, set up between the docked stylus and an electrode set up in the docking station changes—82. The changes are measured 84 to infer rotation, depression or tilt—86—of the stylus. The changes are used to generate signals for a digital interface or the like.

The present embodiments may be provided as a system or as a kit to make up the system. The embodiments may include the stylus itself and a docking station with a docking port sized and shaped to firmly hold the stylus. The docking port may have one or more electrodes so that capacitive coupling is set up between the electrode and the stylus when the stylus is located in the port. The capacitive coupling changes due to movements of the stylus inside the docking port as the user presses the stylus to use it as a joystick. A circuit detects changes in the capacitive coupling between the stylus and the first electrode, and thus is able to assess movement of the stylus in the docking station.

The docking station may include a resilient lining within the docking port, which deforms upon rotation, depression or tilting of the stylus by the user. The capacitive coupling may typically be measured between a housing of the stylus and the one or more electrodes in the docking port. Alternatively one or more electrodes may be provided in the stylus housing, so that the capacitive coupling is measured between the electrodes. The stylus electrode may include strips extending along a longitudinal dimension of the stylus over a length selected to include a part of said stylus that is within the docking port.

The stylus may have a tip end tapering towards a tip and a blunt end, and the stylus second electrode may consist of a ring extending radially around the stylus at the tip end.

The stylus may have grounded electrodes and the capacitance may then be measured at the docking station. Alternatively, the docking station may have grounded electrodes in which case capacitance is measured at the stylus.

The docking port electrode may comprise a plurality of strips extending parallel with a longitudinal dimension of the docked stylus. The stylus electrode may then extend over a length of the docking port when the stylus is docked therein.

In an embodiment, either of the stylus and port electrodes comprises a triangular shape having a width changing with angle around a circumferential direction, located opposite a rectangular electrode, such that rotation of the stylus causes a change in coupling capacitance therebetween, thereby to provide a measurable change in capacitance upon rotation of the stylus.

In an embodiment, either of the stylus and port electrodes comprises oppositely facing ring-shaped electrodes with constant width, such that tilting of the stylus causes a change in distance therebetween, thereby to provide a measurable change in capacitance upon tilting.

In an embodiment, one of the stylus and port electrodes comprises a ring-shaped electrode located opposite a vertically oriented triangle, such that depression of the stylus causes a change in coupling capacitance therebetween, thereby to provide a measurable capacitance upon depression of the stylus.

The resilient layer may also include an insulating layer to insulate the port electrode from the stylus, and the resilient layer may be elastic.

According to another aspect there is provided a docking station for use with an inserted stylus to provide a joystick, the docking station comprising a docking port shaped to receive the stylus, and one or more electrodes within the docking port. The electrodes in the docking port are configured for capacitive coupling with the stylus while the stylus is docked in the docking station. A flexible or resilient layer lining the docking port may allow the stylus to be tilted and depressed when inside to provide joystick movements. The tilting and depression give rise to measurable changes in the capacitive coupling which can be used to provide signals for a joystick driver.

Another aspect of the present embodiments relates to the stylus itself. A stylus for use with a docking station to provide a joystick comprises a stylus housing constructed to provide capacitive coupling with an electrode in the docking station when inserted into a docking port thereof. The stylus is in fact inserted into the docking port, and the capacitive coupling provides measurable changes based on rotation, tilt or depression of the stylus in the docking station.

Another aspect of the present embodiments relates to a method of providing joystick-type interaction between a user and a computing device. The method comprises allowing a user to move a stylus when docked within a docking port of said docking station, measuring changes in mutual capacitance between the stylus and the docking station which arise during the moving, and using the measurements to provide inputs to a user interface of the computing device.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A system comprising:
   a stylus comprising one or more first electrodes and a circuit;
   a docking station comprising a docking port defining a recess configured to receive the stylus, wherein the docking port is lined with a resilient layer;
   one or more second electrodes fixed to the docking port, wherein the resilient layer is configured to cover the one or more second electrodes, and wherein the one or more second electrodes are ring shaped; and
   the circuit configured to:
   detect changes in capacitive coupling between the one or more first electrodes on the stylus and the one or more second electrodes fixed to the docking port; and
   determine movement of the stylus in the docking port based on the changes in the capacitive coupling.

2. The system of claim 1, wherein the docking station comprises a resilient layer configured to deform based on tilting of the stylus within the docking port.

3. The system of claim 1, wherein the capacitive coupling is measured between a housing of the stylus and the at least one first electrode.

4. The system of claim 1, wherein the stylus comprises a housing and at least one second electrode mounted on the housing, wherein the capacitive coupling is measured between the at least one first electrode and the at least one second electrode and wherein the resilient layer is configured to be a separating layer between the at least one first electrode and the at least one second electrode.

5. The system of claim 4, wherein the at least one second electrode comprises a plurality of strips extending along a longitudinal dimension of the stylus over a length selected to include a part of the stylus that is configured to be received within the recess.

6. The system of claim 4, wherein the stylus has a tip end tapering towards a tip and a blunt end, and wherein the at least one second electrode comprises a ring extending radially around the stylus at the tip end.

7. The system of claim 4, wherein at least one of the at least one first electrode and the at least one second electrode comprises a triangular shape having a width changing with angle around a circumferential direction, located opposite a rectangular electrode, such that rotation of the stylus causes a change in coupling capacitance therebetween, thereby to provide a measurable change in capacitance upon rotation of the stylus.

8. The system of claim 4, wherein the at least one first electrode is ring-shaped electrodes.

9. The system of claim 1, wherein the stylus has grounded electrodes and changes in capacitive coupling are measured at the docking station.

10. The system of claim 1, wherein the docking station has grounded electrodes and changes in capacitive coupling are measured at the stylus.

11. The system of claim 1, wherein the stylus and the docking station both have active electrodes.

12. The system of claim 1, wherein the at least one first electrode comprises a plurality of strips extending parallel with a longitudinal dimension of the docked stylus.

13. The system of claim 1, wherein the at least one first electrode is triangular shaped.

14. The system of claim 1, wherein the resilient layer comprises an insulating material configured to insulate the at least one first electrode from the stylus.

15. The system of claim 13, wherein the circuit is configured to determine depression of the stylus in the docking port based overlap between the ring-shape and the triangular shape.

16. An apparatus comprising:
- a docking port comprising one or more first electrodes, the docking port configured to receive a stylus comprising one or more second electrodes and a circuit; the one or more first electrodes configured to capacitively couple with the one or more second electrodes while the stylus is docked in the docking port, wherein the one or more second electrodes are ring shaped; and
- a resilient layer lining the docking port and covering the one or more first electrodes, wherein the resilient layer is configured compress based on tilt of the stylus and wherein the tilting gives rise to measurable changes in the capacitive coupling between the one or more second electrodes and the one or more first electrodes to enable the circuit to determine movement of the stylus in the docking port based on the changes in the capacitive coupling.

17. The apparatus of claim 16, wherein the resilient layer is configured compress based on the stylus being depressed in the docking port and wherein the depression in the docking port gives rise to measurable changes in the capacitive coupling.

18. A stylus comprising:
- a circuit
- a housing; and
- at least one stylus electrode bulging outwardly from the housing, wherein the at least one stylus electrode is configured to capacitive couple with at least one ring shaped electrode in a docking station while the stylus is docked in the docking station, wherein changes in the capacitive coupling are measurable by the circuit based on tilt of the stylus in the docking station.

19. A method of providing joystick-type interaction between a user and a computing device, comprising:
- providing a resilient layer that lines a docking port configured to receive a stylus comprising one or more first electrodes and provides an insulating layer between the stylus and an electrode mounted on the docking port, the resilient layer configured to cover one or more second electrodes fixed to the docking port, wherein the one or more second electrodes are ring shaped;
- measuring, by the stylus, changes in mutual capacitance between the one or more first electrodes on the stylus and the one or more second electrodes fixed to the docking port based on compression of the resilient layer during movement of the stylus within the docking port; and
- using the measurements to provide inputs to a user interface of the computing device.

20. The method of claim 19, wherein the resilient layer is overlaid on the one or more second electrodes fixed to the docking port.

* * * * *